(12) United States Patent
Sasikumar

(10) Patent No.: US 10,691,875 B2
(45) Date of Patent: Jun. 23, 2020

(54) POPULATING VISUAL DESIGNS WITH WEB CONTENT

(71) Applicant: Adobe Inc., San Jose, CA (US)

(72) Inventor: Anirudh Sasikumar, Dublin, CA (US)

(73) Assignee: Adobe Inc., San Jose, CA (US)

( * ) Notice: Subject to any disclaimer, the term of this patent is extended or adjusted under 35 U.S.C. 154(b) by 15 days.

(21) Appl. No.: 15/927,655

(22) Filed: Mar. 21, 2018

(65) Prior Publication Data

US 2018/0217965 A1 Aug. 2, 2018

Related U.S. Application Data

(63) Continuation of application No. 14/991,000, filed on Jan. 8, 2016, now Pat. No. 9,959,257.

(51) Int. Cl.
*G06F 40/14* (2020.01)
*G06F 3/0482* (2013.01)
*G06F 40/30* (2020.01)
*G06F 40/106* (2020.01)
*G06F 40/166* (2020.01)
(Continued)

(52) U.S. Cl.
CPC ............ *G06F 40/14* (2020.01); *G06F 3/0482* (2013.01); *G06F 3/04842* (2013.01); *G06F 40/106* (2020.01); *G06F 40/166* (2020.01); *G06F 40/177* (2020.01); *G06F 40/221* (2020.01); *G06F 40/279* (2020.01); *G06F 40/30* (2020.01); *G06F 3/04817* (2013.01)

(58) Field of Classification Search
CPC . G06F 17/2247; G06F 17/248; G06F 17/2725
USPC ................ 715/234, 235, 237, 240
See application file for complete search history.

(56) References Cited

U.S. PATENT DOCUMENTS 6,738,079 B1 5/2004 Kellerman et al.
7,010,746 B2 3/2006 Purvis
(Continued)

FOREIGN PATENT DOCUMENTS

WO WO-03098370 11/2003

OTHER PUBLICATIONS

"Notice of Allowance", U.S. Appl. No. 15/927,655, dated Apr. 10, 2019, 8 pages.
(Continued)

*Primary Examiner* — Andrew R Dyer
(74) *Attorney, Agent, or Firm* — SBMC

(57) ABSTRACT

Techniques are described for populating visual designs with web content. In implementations, a document design is generated via a digital media application. The document design includes a layout of repeating design elements, such as a grid or table of repeating areas each having various design elements. Web content having a structured arrangement of data elements is accessed through a data panel exposed via the application. The web content data may be linked to the document design to populate elements of the document design with "real-world" data. To do so, the web content is to detect semantically similar repeating data elements by based on element positions, node types, style types, and node hierarchies reflected by structured data defining the web content. Design elements in the layout of the document design are then auto-populated with content of the semantically similar repeating data elements to produce a preview linked to "real-world" data.

20 Claims, 13 Drawing Sheets

(51) Int. Cl.
*G06F 40/177* (2020.01)
*G06F 40/221* (2020.01)
*G06F 40/279* (2020.01)
*G06F 3/0484* (2013.01)
*G06F 3/0481* (2013.01)

(56) References Cited

U.S. PATENT DOCUMENTS

| | | | |
|---|---|---|---|
| 7,069,003 B2 | 6/2006 | Lehikoinen et al. | |
| 7,171,617 B2 | 1/2007 | Harrington et al. | |
| 7,451,140 B2 | 11/2008 | Purvis et al. | |
| 7,844,897 B1 | 11/2010 | Cooley et al. | |
| 7,847,971 B2 | 12/2010 | Kobashi et al. | |
| 9,152,619 B2 | 10/2015 | Meschkat | |
| 9,262,385 B2 | 2/2016 | Ebner | |
| 9,910,572 B2* | 3/2018 | Anderson | G06F 3/04842 |
| 9,934,208 B2 | 4/2018 | Sasikumar | |
| 9,959,257 B2 | 5/2018 | Sasikumar | |
| 10,372,304 B2 | 8/2019 | Jaramillo et al. | |
| 2003/0229607 A1 | 12/2003 | Zellweger et al. | |
| 2004/0003351 A1 | 1/2004 | Sommerer et al. | |
| 2004/0034613 A1 | 2/2004 | Purvis et al. | |
| 2004/0109137 A1 | 6/2004 | Bubie et al. | |
| 2004/0205588 A1 | 10/2004 | Purvis et al. | |
| 2004/0255245 A1 | 12/2004 | Yamada et al. | |
| 2004/0268300 A1 | 12/2004 | Huin et al. | |
| 2005/0060277 A1 | 3/2005 | Zlatanov et al. | |
| 2005/0154980 A1 | 7/2005 | Purvis et al. | |
| 2005/0172224 A1 | 8/2005 | Kobashi et al. | |
| 2005/0172226 A1 | 8/2005 | Kobashi et al. | |
| 2005/0179947 A1 | 8/2005 | Kobashi et al. | |
| 2005/0237321 A1 | 10/2005 | Young | |
| 2006/0013462 A1* | 1/2006 | Sadikali | G06F 19/321 382/132 |
| 2006/0029125 A1 | 2/2006 | Kobashi et al. | |
| 2006/0101035 A1 | 5/2006 | Mustakallio et al. | |
| 2006/0155699 A1 | 7/2006 | Purvis et al. | |
| 2007/0006072 A1 | 1/2007 | Purvis | |
| 2010/0257243 A1 | 10/2010 | Eilers et al. | |
| 2011/0099159 A1 | 4/2011 | Trevor et al. | |
| 2011/0214078 A1* | 9/2011 | Klask | G06F 8/38 715/763 |
| 2012/0041985 A1* | 2/2012 | Engel | G06F 3/04842 707/792 |
| 2012/0210206 A1 | 8/2012 | Sun | |
| 2013/0174015 A1 | 7/2013 | Jeff L. | |
| 2014/0189548 A1* | 7/2014 | Werner | G06F 3/0481 715/762 |
| 2014/0245197 A1* | 8/2014 | Swanke | G06F 3/0481 715/762 |
| 2014/0282161 A1* | 9/2014 | Cash | G06F 3/017 715/769 |
| 2015/0089420 A1 | 3/2015 | Murata et al. | |
| 2016/0342296 A1 | 11/2016 | Jaramillo et al. | |
| 2016/0342315 A1 | 11/2016 | Jaramillo et al. | |
| 2017/0199851 A1 | 7/2017 | Sasikumar | |
| 2017/0199852 A1 | 7/2017 | Sasikumar | |

OTHER PUBLICATIONS

"Supplemental Notice of Allowance", U.S. Appl. No. 14/719,177, dated May 29, 2018, 2 pages.
"Final Office Action", U.S. Appl. No. 15/016,062, dated May 22, 2018, 29 pages.
Frye,"Microsoft Excel 2013 Plain Simple—Chapter 7", Apr. 2013, 34 pages.
"Notice of Allowance", U.S. Appl. No. 14/719,177, dated Apr. 26, 2018, 12 pages.
"About Patterns", Retrieved from <https://helpx.adobe.com/illustrator/using/patterns.html?>—on Dec. 20, 2017, Dec. 5, 2017, 11 pages.
"Creating Patterns", Retrieved from <https://helpx.adobe.com/photoshop/using/creating-patterns.html>—on Dec. 20, 2017, Feb. 15, 2017, 1 page.
"Creating rectangular arrays (linear patterns) AutoCAD Tutorials", Retrieved at: https://www.youtube.com/watch?v=WVtthi3d6ls, Jan. 8, 2013, 2 pages.
"Design, Manage & Publish Professional Websites, Without Code. | Webydo", Retrieved at: http://www.webydo.com/features.html—on Aug. 12, 2016, 6 pages.
"Final Office Action", U.S. Appl. No. 14/719,177, dated Oct. 12, 2017, 20 pages.
"Final Office Action", U.S. Appl. No. 14/991,000, dated Mar. 13, 2017, 27 pages.
"Final Office Action", U.S. Appl. No. 14/991,000, dated Sep. 12, 2017, 31 pages.
"Final Office Action", U.S. Appl. No. 15/016,062, dated Feb. 10, 2017, 17 pages.
"Final Office Action", U.S. Appl. No. 15/065,444, dated Mar. 15, 2017, 26 pages.
"Final Office Action", U.S. Appl. No. 15/065,444, dated Sep. 11, 2017, 16 pages.
"First Action Interview Office Action", U.S. Appl. No. 14/719,177, dated Jan. 19, 2017, 19 pages.
"First Action Interview Office Action", U.S. Appl. No. 14/719,177, dated Apr. 20, 2017, 5 pages.
"First Action Interview Office Action", U.S. Appl. No. 14/991,000, dated Dec. 7, 2016, 4 pages.
"First Action Interview Office Action", U.S. Appl. No. 15/065,444, dated Dec. 8, 2016, 4 pages.
"How to Transform and Duplicate Objects in Adobe Illustrator", Designmodo, retrieved from the Internet: <URL:http://designmodo.com/transform-duplicate-objects-illustrator/>, Feb. 22, 2013, 10 pages.
"Non-Final Office Action", U.S. Appl. No. 14/719,177, dated Dec. 29, 2016, 19 pages.
"Non-Final Office Action", U.S. Appl. No. 14/991,000, dated Jun. 9, 2017, 31 pages.
"Non-Final Office Action", U.S. Appl. No. 15/016,062, dated Oct. 12, 2017, 23 pages.
"Non-Final Office Action", U.S. Appl. No. 15/016,062, dated Oct. 20, 2016, 18 pages.
"Non-Final Office Action", U.S. Appl. No. 15/065,444, dated Jun. 9, 2017, 29 pages.
"Notice of Allowance", U.S. Appl. No. 14/991,000, dated Dec. 19, 2017, 18 pages.
"Notice of Allowance", U.S. Appl. No. 15/065,444, dated Dec. 18, 2017, 17 pages.
"Pre-Interview Communication", U.S. Appl. No. 14/991,000, dated Oct. 27, 2016, 4 pages.
"Pre-Interview Communication", U.S. Appl. No. 15/065,444, dated Oct. 27, 2016, 4 pages.
Fane,"AutoCAD 2014 for Dummies, Chapter 18", John Wiley and Sons, 2013, pp. 321-350.
Green,"Associative Arrays—Editing Source Objects", Retrieved at: https://www.youtube.com/watch?v=SZhSrBilN_8, Aug. 1, 2011, 2 pages.
Roskes, "Google SketchUp Cookbook—Chapter 1", O'Reilly Media, Mar. 30, 2009, 50 pages.

* cited by examiner

POPULATING VISUAL DESIGNS WITH WEB CONTENT

RELATED APPLICATIONS

This application is a continuation of and claims priority to U.S. patent application Ser. No. 14/991,000, filed Jan. 8, 2016, entitled "Populating Visual Designs with Web Content," the disclosure of which is contained herein in its entirety by reference.

BACKGROUND

Today, individuals frequently use word processors, text editors, web development tools and other digital media applications to create and edit web pages, visual designs for content, user interface designs (UX), web documents, and other work product. In connection with designing a document layout and editing the layout, users may want to use representative data to populate the design and thereby get a preview of how the document design will appear when completed. Traditionally, developers utilize an offline set of placeholder data for design previews. Unfortunately, the placeholder data may not accurately reflect "real-word" data for which the document design is created. Additionally, the developer may have to individually link each element of the design to selected items of the placeholder data on an element-by element basis. Manual processes for linking data to the design elements are feasible for simple designs, but become complicated and tedious for sophisticated designs such as dynamic visual designs that include large numbers of elements and structured arrangements of repeating elements. Thus, not only do existing techniques for linking data to a visual design require considerable effort on the part of the users, using offline placeholder data may be complicated, time consuming, and inaccurate.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for populating visual designs with web content are described herein, which facilitate creation of content via a digital media application. In implementations, a document design is generated via a user interface for a digital media application. The document design includes a layout of repeating design elements, such as a grid or table of repeating areas each having an arrangement of text boxes, image frames, and other design elements. In connection with creating the document design, web content having a structured arrangement of data elements is accessed through a data panel exposed via the user interface. For example, the data panel provides browsing functionality to access web pages and web-based APIs via the internet, which may be used to populate elements of the document design with "real-world" data. To link the web content accessed via the data panel to the document design, input indicative of a design element selected in the document design and a data element selected in the data panel is obtained via the user interface. The web content is then parsed responsive to the input to recognize repeating data elements corresponding to the selected data element. The parsing involves detecting semantically similar repeating data elements element by correlating the data elements to the selected data element based on element positions, node types, style types, and node hierarchies reflected by structured data defining the web content. Design elements in the layout of the document design are then auto-populated with content of the semantically similar repeating data elements to produce a preview linked to "real-world" data of the web content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
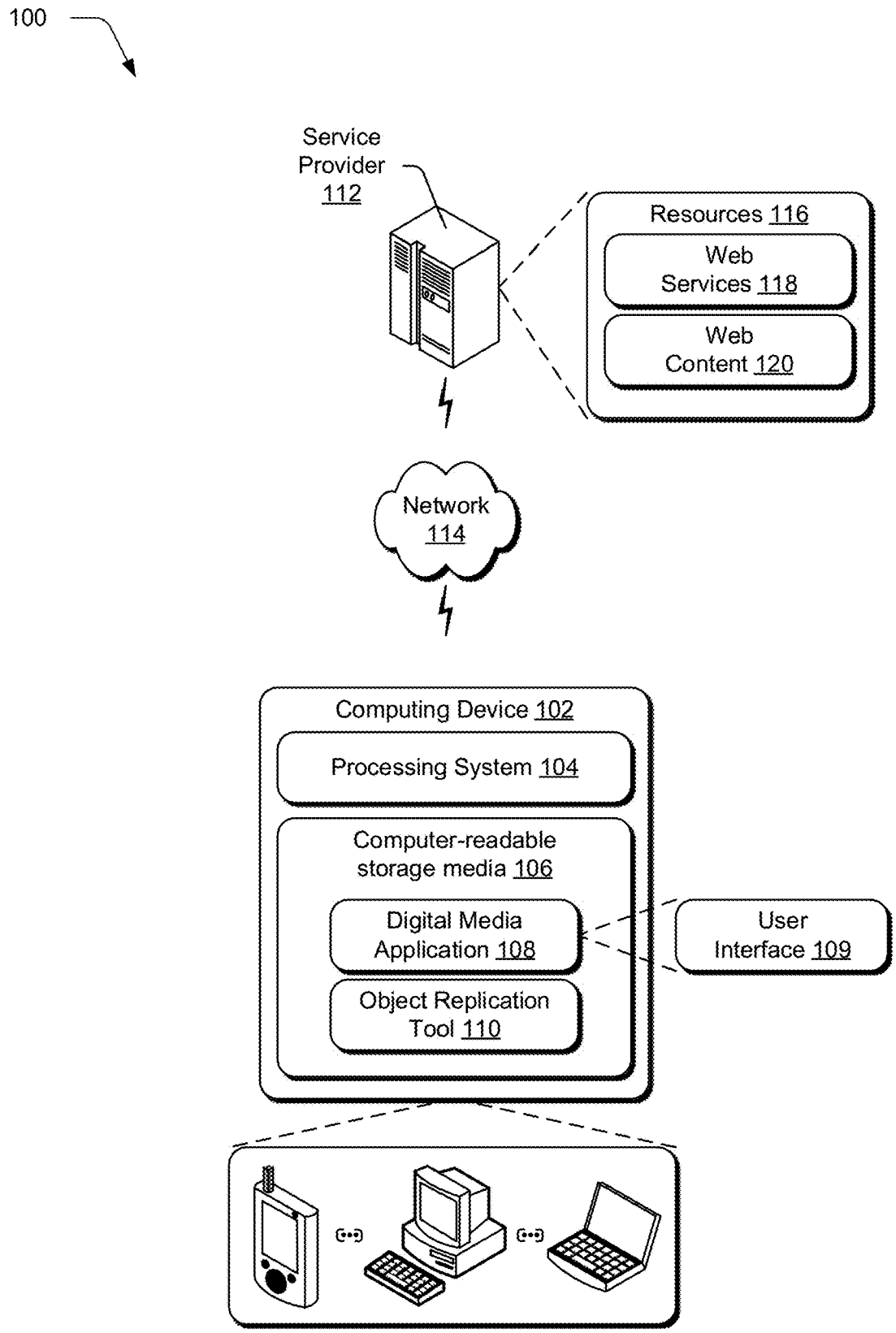
FIG. 1 is an illustration of an example operating operable to employ techniques described herein.

Traditionally, developers utilize offline placeholder data sets when creating a visual design to generate previews of the design. Unfortunately, the placeholder data may not accurately reflect "real-word" data for which the document design is created. Additionally, the developer may have to individually link each element of the design to a selected item of the placeholder data on an element-by element basis. Manual processes for linking data to the design elements are feasible for simple designs, but become complicated and tedious for sophisticated designs, such as dynamic visual designs that include large numbers of elements and structured arrangements of repeating elements.

Techniques for populating visual designs with web content are described herein. The techniques may be used to facilitate creation of content via a digital media application. In implementations, a document design is generated via a user interface for digital media application. The document design includes a layout of repeating design elements, such as a grid or table of repeating areas each having an arrangement of text boxes, image frames, and other design elements. In connection with creating the document design, web content having a structured arrangement of data elements is accessed through a data panel exposed via the user interface. For example, the data panel provides browsing functionality to access web pages and web-based API via the internet, which may be used to populate elements of the document design with "real-world" data. To link the web content accessed via the data panel to the document design, input indicative of a design element selected in the document design and a data element selected in the data panel is obtained via the user interface. The web content is then parsed responsive to the input to recognize repeating data elements corresponding to the selected data element. The parsing involves detecting semantically similar repeating data elements element by correlating the data elements to the selected data element based on element positions, node types, style types, and node hierarchies reflected by structured data defining the web content. Design elements in the layout of the document design are then auto-populated with content of the semantically similar repeating data elements to produce a preview linked to "real-world" data of the web content.

In implementations, an object replication tool can be provided to facilitate layout of repeating design elements in conjunction with document design creation and editing via various digital media applications. The object replication tool may include, invoke, or otherwise make use of a data linker component operable to access web content and populate elements of the document design with "real-world" data. The object replication tool can be implemented as an integrated or add-in component of various types of applications including an integrated UX design and prototype tool, word processors, a web authoring tool (e.g., Adobe Dreamweaver™, Adobe InDesign™), an HTML editor, a presentation application, or a web browser, to name a few examples. The object replication tool can also be implemented as a web application or service that is accessible from a service provider over a network.

In one or more implementations, a visual document design can be created or edited using functionality exposed via a user interface for the digital media application. By way of example, the digital media application may be configured as a design tool that enables creations of web pages or UXs for applications. As part of the creation process, the object replication tool may be used to produce a repeatable object set containing repeating design elements. The object replication tool additionally provide functionality to replicate the object set across portions of a layout structure (e.g., grid or table) for the visual document design while maintaining layout and positioning of the elements within each portion. Further, the object replication tool provides functionality to access web content from various sources and auto-populate elements within the layout structure using the web content as described above and below.

In this context, a repeatable object set refers to a set of one or more elements that are generally presented as a group and can be repeated within a visual display, such as within portions of a layout structure (e.g., a grid or table). An element can be any type of visual design element, such as a text box, an image frame, a multimedia object, and so forth. By way of example and not limitation, a repeatable object set may contain be an icon, a background image, and multiple text fields. As described herein, a repeatable object set can be efficiently replicated in various portions within a layout structure. An example of a commonly used layout structure is a grid or table designed to have multiple distinct portions such as columns and/or rows, an array of cells, or an arrangement of distinct areas.

Techniques for populating visual designs with web content as described in this document enable users who produce creative content to efficiently access and utilize web-based content for design and prototyping of their projects. Web content at a selected URL is accessed and automatically parsed to determine related data elements within structured data defining the web content. Data elements in the web content are correlated one to another based on various factors including but not limited to element position, node type, styles, and node hierarchies. For a selected data element from the web content, corresponding elements are discovered based on the analysis and used to auto-populate design elements contained in the document design. In this manner, content from the web document may be easily linked to repeating elements in the layout for the document design without having to make links element-by-element. Consequently, a user is able to focus on content creation and does not have to expend undue time and energy to manually locate placeholder data and map each element to the placeholder data.

In the following discussion, an example environment is first described that may employ the techniques described herein. Example implementation details and procedures are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a digital media application 108 embodied on the computer-readable storage media 106 and operable via the processing system 104 to implement corresponding functionality described herein. In at least some embodiments, the digital media application 108 may represent a desktop application that provides integrated functionality to create and edit web pages, visual designs for content, user interface designs (UX), web documents, and other work product. The integrated functionality is accessible via a user interface 109 exposed by the digital media application 108 having various tools, elements, controls, menus, pages and other features to facilitate creation and editing of visual design. The digital media application 108 may also include functionality operable to access various kinds of web-based resources (e.g., content and services) to facilitate creation of content and access to download web content for inclusion in a design. The digital media application 108 may also represent a client-side component operable to interact with online providers to access "cloud-based" resources and applications, such as being a browser or network-enabled application configured to interact with web services and web content available from a service provide to implement aspects of the techniques described above and below. In implementations, the digital media application 108 represents an integrated UX design and prototyping tool.

The computing device 102 may also include or make use of an object replication tool 110 that represents functionality operable to implement various aspect of techniques for populating visual designs with web content as described above and below. As noted above, the object replication tool 110 is operable to facilitate layout of repeating design elements in conjunction with document design creation and editing via various digital media applications. The object replication tool may further include, invoke, or otherwise make use of a data linker component to access web content, details of which are discussed in relation to the following figures.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 12

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web services 118 represent one particular kind of resource 116 that may be accessible via a service provider 112. Web service 118 may be operated over a network 114 using a browser or other client application module 108 to obtain and run client-side code for various services and application. In at least some implementations, a runtime environment for execution of the web services 118 is provided by the browser (or other client application module 108). Thus, service and content available from the service provider may be accessible in a cloud-based environment as web-applications in some scenarios.

The service provider is further illustrated as including web content 120 that may be accessed via the service provider 112 and used to populate a document design in accordance with techniques described herein. The web content 120 is representative of a server-side repository of content include web sites, web pages, documents, and other content. Additionally, the web content 120 may include Java Script Object Notation application programming interfaces (JSON APIs) configured to expose a hierarchal tree structure of JSON nodes corresponding to an underlying web pages or other resource 116. In implementations, the web content 120 is inclusive of publically accessible web pages and APIs available via the Internet. Web content 120 may also include private content available locally, via an intranet, or through other non-public/secured sources.

Having considered an example environment, consider now a discussion of some example details of techniques for extrapolative stock image searches in accordance with one or more implementations.

Populating Visual Designs with Web Content Implementation Details

This section describes some example details of techniques for populating visual designs with web content in accordance with one or more implementations. The details are discussed in relation to some example scenarios, user interfaces, and procedures, of FIGS. 2-8. The procedures discussed below are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to resources 116, web service 118, and web content. Aspects of the procedures may also be performed by a suitably configured device, such as the example computing device 102 of FIG. 1 that includes or makes use of an object replication tool 110 and/or a digital media application 108.

In general, functionality, features, and concepts described in relation to the examples above and below may be employed in the context of the example procedures described in this document. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
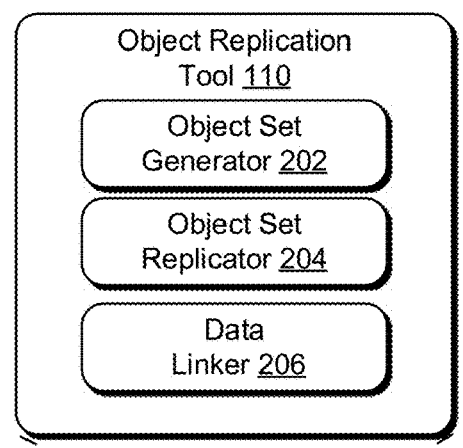
FIG. 2 depicts an example implementation of an object replication tool of FIG. 1 shown in greater detail in accordance with one or more implementations.
Figure 2:
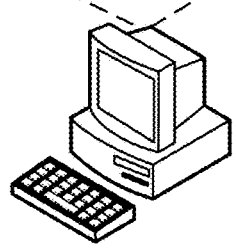

FIG. 2 depicts an example implementation of the object replication tool 110 of FIG. 1 shown in greater detail. The object replication tool 110 is generally configured to enable replication of repeatable object sets within a visual document design. The object replication tool 110 may be implemented as a software module, a hardware device, or using a combination of software, hardware, firmware, fixed logic circuitry, etc. The object replication tool 110 may be implemented as a standalone component of a computing device 102 or alternatively as a component of the digital media application module 108, an operating system, or other device application. By way of example and not limitation, the object replication tool 110 in the example of FIG. 2 includes an object set generator 202, an object set replicator 204, and a data linker 206 that operate as described herein.

As noted, a repeatable object set refers to a set of one or more elements that are generally presented as a group and can be repeated within a visual display, such as within various portions within a layout structure. An element can be any type of object or item, such as a text box, an image frame, a multimedia object, a container, and so forth. An element may be defined or characterized by content, a container for the content, and/or a format. Content refers to the content or substance that may be included as part of the element. For example, content may be a particular image, particular text (e.g., "hello"), particular video, a particular icon, or the like. A container refers to boundaries or a frame associated with the element in which corresponding content is placed. In effect, a container is a placeholder which may be populated with content for the element. Thus, a text box includes bounds in which text can be displayed, an image frame is designed to contain an image, a multimedia object has a container for an icon, frame(s) or other representation of multimedia content, and so forth. A format might be any format applied to an element, such as size (e.g., text size, image size), color (e.g., text color), style (e.g., font style, borders, effects, etc.).

Accordingly, the object set generator 202 represents functionality to form repeatable object sets in connection with creating a visual design via an application. Generation of the repeatable object set, or a portion thereof, can be performed in any manner and is not intended to be limited to examples discussed herein. Generally, a repeatable object set is generated based on a user interaction with the digital media application 108 and/or object replication tool 110 to define elements and create a layout structure for a visual design. Selections may be made via various drawing tools, text controls, style tools, menus, and other UI instrumentalities exposed via the digital media application 108 to define elements and then group multiple elements together as a repeatable object set. For example, a user may make selections to create and format an image frame and a corresponding text description, position these elements within a layout structure, and then invoke the object set generator 202 to join the elements as a repeatable object set.

Object set replicator 204 represents functionality to replicate the repeatable object set. In this regard, the object set replicator 108 can replicate a repeatable object set into various elements within a layout structure. Replication involves creating copies of the elements in repeatable object set and arranging the elements in a defined layout structure, such as an x-y grid or a table. Elements of the same type are replicated having the same format. Typically, format changes applied to a particular element within a repeatable object set are applied to corresponding elements in replicated object sets. Corresponding elements in different repeatable object set, though, may be populated with different content.

Replication may be triggered via selection of a replication tool, for example, in accordance with or upon generation of a repeatable object set. For example, a user might select a "replicate" control or menu item to initiate the replication. In other words, the object set replicator 204 detects an indication to apply a replication and then directs replication of the repeatable object set object into one or multiple replicated object sets in accordance with the indication. This results in creation of a document design including a layout of repeating design elements reflected by the repeatable object set object and any replications thereof. In one approach, boundaries of the repeatable object set are selectable and draggable with the replication tool active to expand the boundaries and produce replications of the repeatable object set in dependence upon the expansion. In another approach, a grid or table size for the document design may be defined and then filled with repeating design elements that are replicated from elements included in a repeatable object set designated for the replication. Further details and examples regarding repeatable object sets and object set replication techniques can be found in co-pending application Ser. No. 14/719,177 titled "Facilitating Object Set Replication" and filed May 21, 2015, the disclosure of which is incorporated herein by reference in its entirety.

Naturally, a layout of repeating design elements may also be arrived at without using the object set replicator 204. For example, a user may manually create, format, and arrange elements in a repeating structure by individually defining each element. In addition, elements may be manual copied and pasted to produce a repeating structure of design elements. Techniques for populating visual designs described herein are equally applicable to document designs produced using the object set replicator 204 and document designs having a layout of repeating design elements created in other ways. Moreover, the described techniques may be applied during creation of a new visual document design as well as in connection with editing of existing designs via a digital media application 108.

Data linker 204 represents functionality to implement techniques for populating visual designs described above and below. In particular, the data linker 204 is operable to facilitate access to web content and populating of elements of a document design with "real-world" data. In one approach, the data linker 204 implements a data panel within the user interface 109 of the digital media application that exposes functionality for populating visual designs with data. The data linker 204 may enable linking to local, placeholder data in accordance with traditional approaches. In addition or alternatively, the data linker 204 enables access to web content from online and/or public sources accordance with techniques described herein, such as web content 120 available over a network from a service provider 112 or other sources. Web content for linking to a document design may be specified via a URL input or selected via the data panel, such as by entering a web page address in an address bar, using a favorites list, or conducting a web search through the data panel. The web content may include but is not limited to publicly accessible web pages or JSON APIs configured to expose hierarchal tree structures of JSON nodes for corresponding web sites and web pages. For example, the data panel implemented by the data linker 204 or otherwise is configured to obtain input indicative of a URL specified for the web content and communicate over a network connection to access and download the web content from the specified URL. Then, view of the web content is rendered and displayed via the data panel.

In addition or alternatively, the data linker 204 may be configured to handle data documents that are dragged and dropped into the design user interface. For example, a user may optionally drop a JSON file or URL string onto a document design canvas exposed via the user interface 109. When this occurs, the data linker 204 recognizes the document and initiates processing to obtain corresponding content, parse the content, and populate a visual design with data accordingly. In addition to processing, the data linker 204 may respond to dropping of the file on the canvas by launching the data panel to expose a rendered view of the content, such as a web page indicated by the URL or a tree structure corresponding to the JSON file. Accordingly, a designer can quickly and easily access web content and make use of the data panel/data linker by moving data files of interest directly onto the design canvas.

To link the web content accessed via the data panel to the document design, input indicative of a design element selected in the document design and a data element selected in the data panel is obtained via the user interface 109. The web content is parsed responsive to the input (via the data linker 204 or comparable functionality) to recognize repeating data elements corresponding to the selected data element. In an implementation, the parsing involves detecting semantically similar repeating data elements by correlating the data elements to the selected data element based on element positions, node types, style types, and node hierarchies reflected by structured data defining the web content. Details regarding operations and algorithms suitable to detect semantically similar repeating data in web content can be found below in the discussion of the example procedures of FIGS. 9 and 10.

Generally speaking, though, a structured arrangement of web content that is accessed via the data panel may be analyzed to identify semantically similar repeating data elements within the structured arrangement. Based on this analysis, repeating data elements identified within the structured arrangement of the web content are matched to repeating design elements included in the layout of the document design. The design elements in the layout of the document design are then auto-populated with content of the semantically similar repeating data elements to produce a preview of the document that is linked to "real-world" data of the web content. Further details regarding these and other aspects of populating visual designs with web content are discussed further in relation to the examples of FIGS. 3 to 12 that follow.

Figure 3:
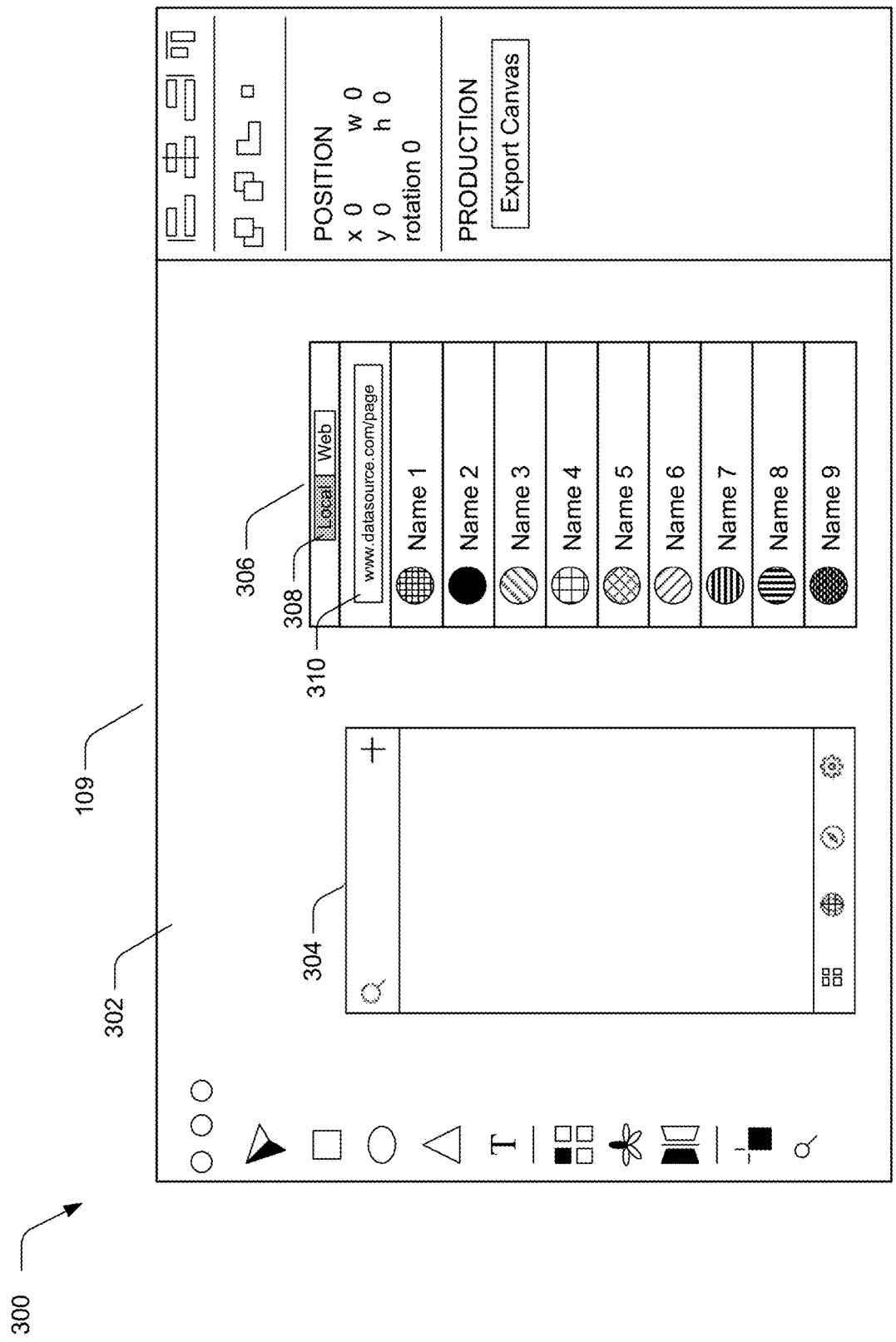
FIG. 3 depicts an example implementation of a user interface for a digital media application in accordance with one or more implementations.

To illustrate, FIG. 3 depicts generally at 300 an example implementation of a user interface 109 for a digital media application in accordance with one or more implementations. The example user interface 109 includes a document display pane 302 in which various document previews, windows, toolbars, menus, controls, icons, UI panels, and the like may be displayed to facilitate document creations and editing. In accordance with techniques described herein, the user interface 109 provides a variety of functionality and features to facilitate creation of content. In an implementation, the user interface 109 corresponds to a digital media application in the form of an integrated UX design and prototype tool for creation of visual designs, such as web pages and user interfaces.

The document display area 302 of FIG. 3 displays an editing pane 304 that presents a document design for the visual design being created and/or edited via the user interface 109. In this example, the document design in the editing pane 304 represents a UX for a mobile device application. The document display area 302 additionally includes a data panel 306 that is operable to access data from various sources and facilitate linking of the data to elements in the document design 304 in accordance with techniques described herein. Data panel as used herein refers to functionality implemented via an application to access and display data within a user interface. A data panel may be a separate window exposed by the UI (such as the example data panel 306). A data panel may also be implemented using other configurations and user interface instrumentalities that facilitate access to and rendering of data from different sources. By way of example and not limitation, a data panel may be implemented as a tab, side bar, pane of the user interface, or pop-up dialog exposed by the UI for the digital media application. Sources can include local sources as well as publicly accessible web pages and data. In this context, the data panel implements built-in functionality for browsing and displaying data in the context of a digital media application and visual designs created using the application. The data panel could also be implemented by a browser or other separate application that is linked to the digital media application. The data panel is configured to process and render web pages and other structured data such as XML and other mark-up language documents, JSON data representations, and so forth.

In FIG. 3, the data panel 306 includes a selector control 308 operable to toggle between different available data sources. Here, the selector control 308 enables selection between a local repository of data (e.g., offline placeholder data) and web-content from web-based sources (e.g., online "real-world" data). In the example, the selector control is positioned to select "Web" and thus enable access to web content via the data panel 306. An address bar 310 configured to accept input indicative of a URL specified for the web content is also included. Responsive to input of the URL via the address bar 310, the data panel 306 initiates communication over a network to access and download the web content from the specified URL. Then, a view of the web content is rendered and displayed via the data panel 306 as represented in FIG. 3.

Note that the user interface 109 is configured to render a view of the document design in the editing pane along with a view of the web content in the data panel 306. Selection of tools and elements in the various view may then be made to implement techniques to link data of elements contained in the web content with design elements in the document design. The user interface 109 may also be configured to facilitate creation and replication of repeatable object sets in connection with creating a visual design via an application.

Figure 4:
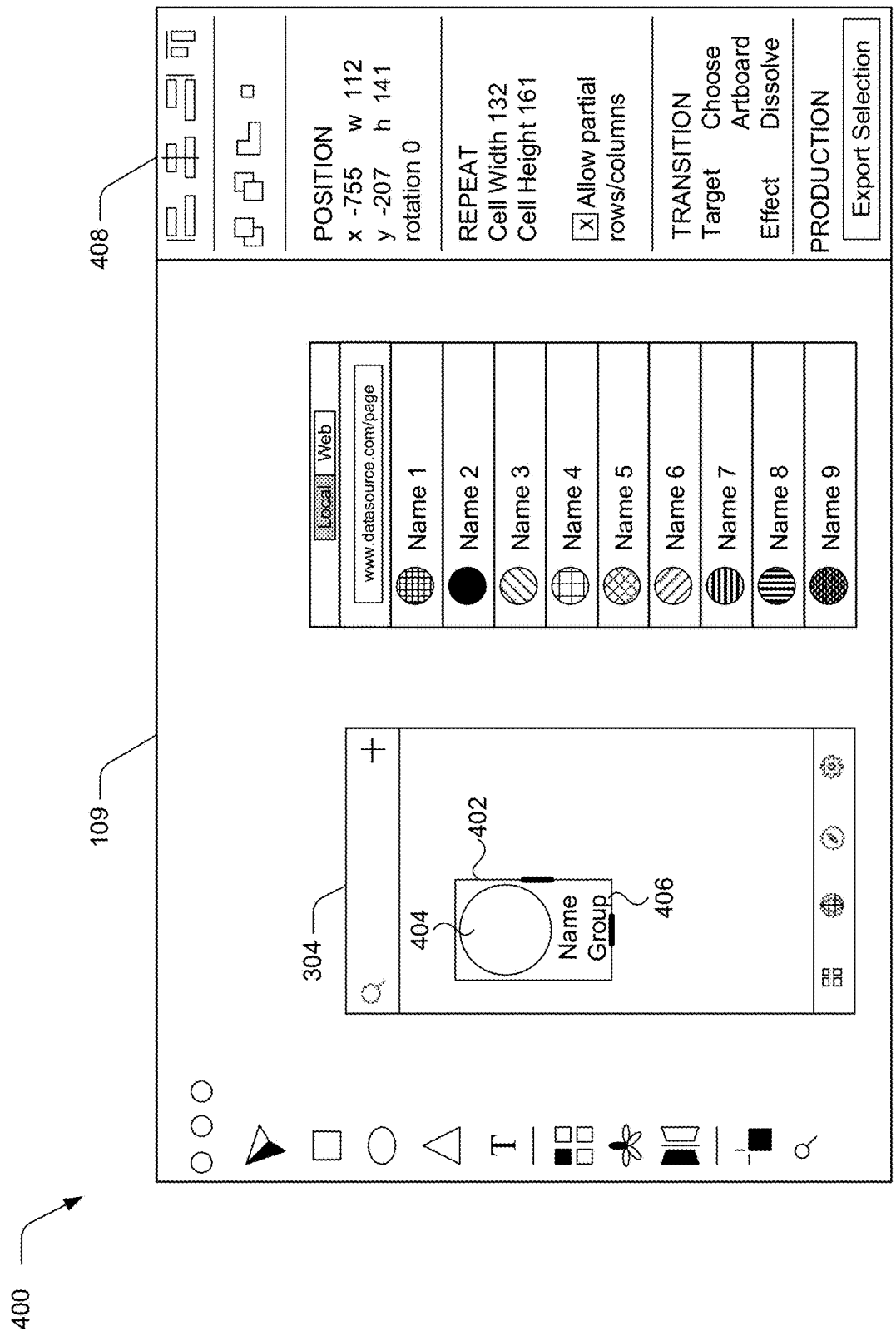
FIG. 4 depicts creation of a repeatable object set via a user interface in accordance with one or more implementations.

To illustrate, consider FIG. 4 which depicts generally at 400 a scenario for creation of a repeatable object set in accordance with one or more implementations. As illustrated in FIG. 4, using techniques described herein, a user can initiate creation of a repeatable object set 402 for inclusion with the document design presented in the editing pane 304. One way to do so is to select design elements originally individually added to the design and then select a repeat icon, menu item, control or other suitable repeat tool provided by the user interface 109 to form a group of elements and initiate replications. In an implementation, selection of the repeat tool launches a replication dialog 408 that exposes various functionality related to forming, replicating, and modifying repeatable object sets. In the example of FIG. 4, the replication dialog 408 is illustrated as a side panel of the UI, however, other implementations are also contemplated such as a pop-up dialog box, a tab, or separate window. Design element 404 and design element 406 are depicted in FIG. 4 as illustrative examples selecting a repeat icon. Design element 404 and design element 406 respectively correspond to an image frame and a text box configured as placeholder in the design for corresponding content. Selection of design element 404 and design element 406 in connection with activation of the repeat tool joins these elements together to the repeatable object set 402. The repeatable object set 402 may then be replicated and populated with web content (or other data) in various ways described above and below.

Once a repeatable object set is formed, the repeatable object may be replicated in various ways, examples of which were previously noted. Generally, a layout structure such as a table or grid is defined and replicated design elements are generated based on the original object set to fill the table or grid. In one approach, the layout structure may be dynamically expanded or contracted to modify the design and add/remove replicated design elements.

Figure 5:
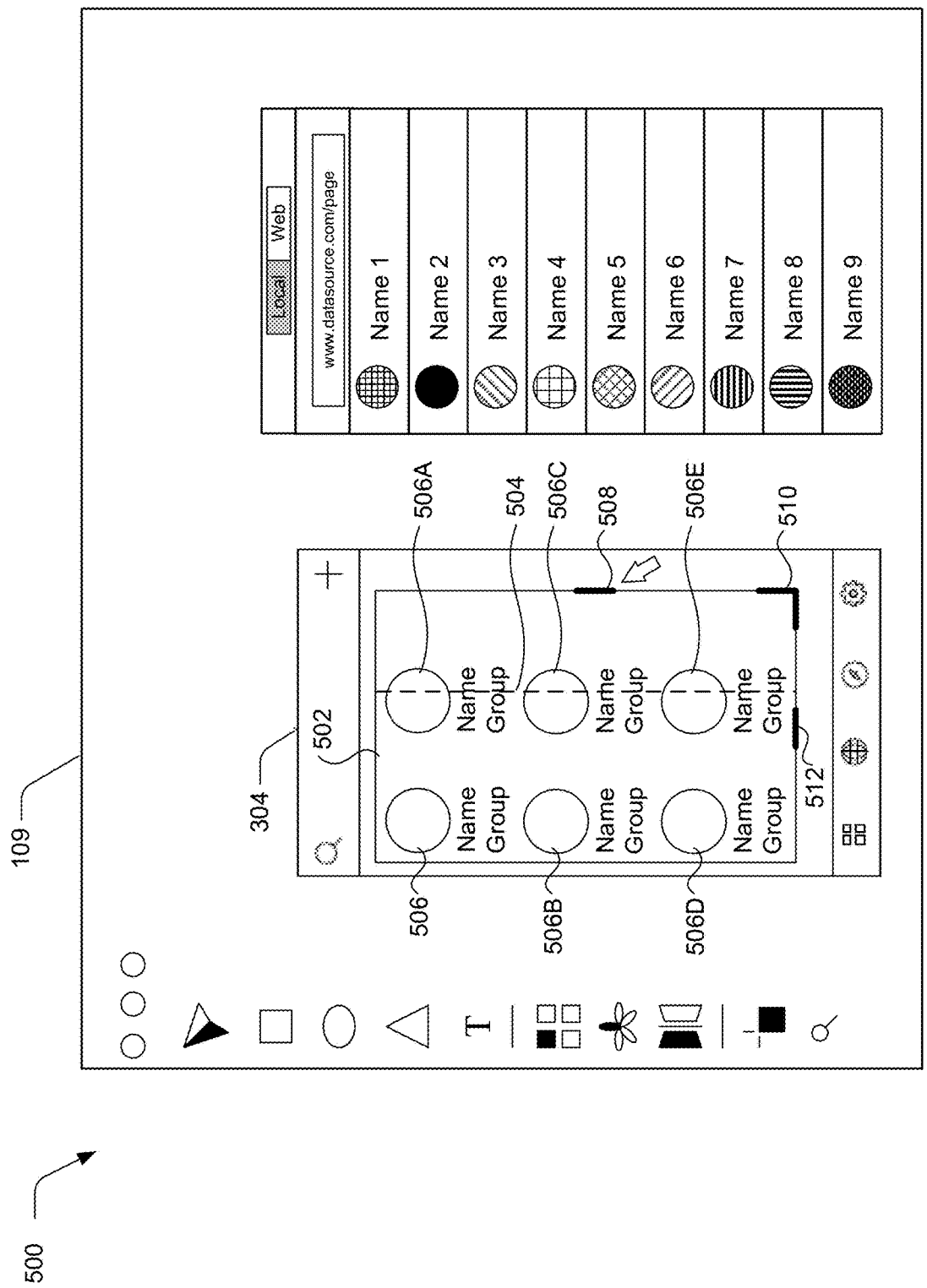
FIG. 5 depicts an illustrative example of object set replication in accordance with one or more implementations.

An illustrative example of object set replication is depicted in FIG. 5, generally at 500. In this example, expansion or contraction of a layout structure 502 for the design in the editing pane occurs by input to select and drag boundaries of the layout structure to adjust the boundaries (e.g., modify the size of structure). Various UI instrumentalities may be included to facilitate boundaries adjustments, such as drag handles, a resize tool, corner adjustment points, and so forth. For example, the current boundaries shown for layout structure 502 may be produced by expansion of the repeatable object set 402 represented in FIG. 4. Conversely, the layout structure 502 of FIG. 5 may be contracted by adjustment of the boundaries, such as resizing the width of the layout as represented by the dashed line 504. In either case, the adjustment of the boundaries causes corresponding changes to the document design and replications of the object set.

In the case of expansion, an initial repeatable object set 506 is replicated to fill the additional portions of the layout structure 520 created by the expansion with additional design elements to form replicated object sets. The replicated object sets are indicated as 506A-506E in FIG. 5. With reference to the example of FIG. 5, assume that a user selects representative handles 508, 510, and/or 512 to expand the layout structure 502. In accordance with increasing the size of the layout structure 502, the replicated object sets 506A-506E are formed. In this manner, a user is able to easily create object sets and replicate the object sets within a document design. Generally, modifications applied to a particular object set or individual element are applied across the replicated object sets of the layout structure 502. For example, changing a font size or type for a text box of one object set produces the same change to the font size or type for corresponding text boxes throughout the layout structure. Additionally, the instances of the repeatable object sets and design elements included in the layout structure may be auto-populated with content in various ways, details and examples of which are contained in the following discussion of FIGS. 6 to 12.

Figure 6:
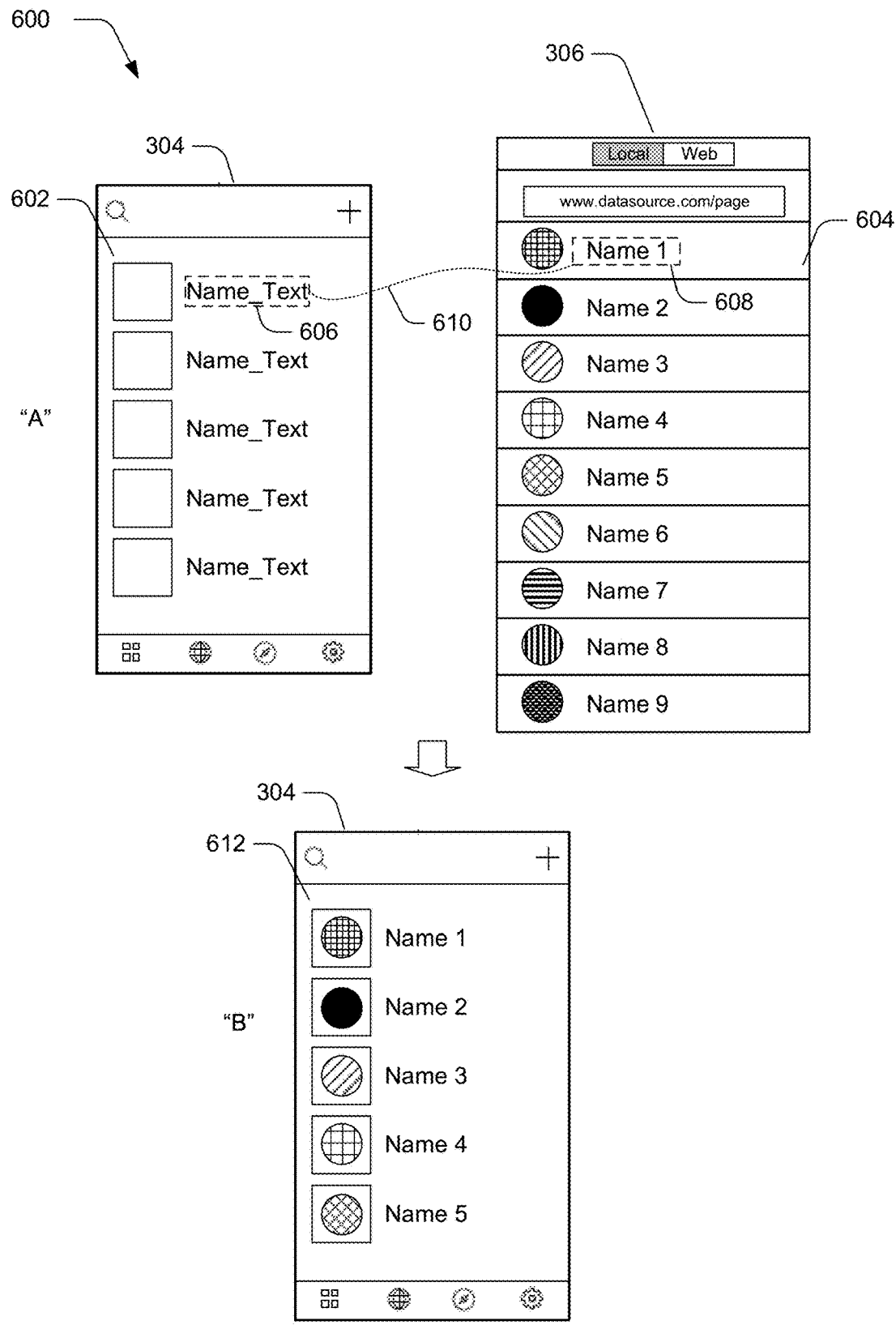
FIG. 6 is a diagram depicting a scenario in which a layout structure having repeating design elements is auto-populated with content in accordance with one or more implementations.

FIG. 6 is a diagram depicting generally at 600 a scenario in which a layout structure having repeating design elements is auto-populated with content in accordance with one or more implementations. In particular, view "A" in FIG. 6 includes representations of the editing pane 304 and data panel 306 as previously discussed. In this example, the editing pane 304 displays a document design including an example layout structure 602 with repeating design elements. The document design may represent a new design that is being created via a digital media application 108 or an existing design or template being edited to produce an updated design. The layout structure 602 with repeating design elements may be produced using object set replication techniques as described herein to automatically replicate the repeatable object set. The layout structure 602 or portion thereof may alternatively be created by manually defining and arranging elements on an element-by-element basis, using copy/paste operations, and/or otherwise without the use of a replication tool.

The data panel 306 is represented as accessing and displaying web content from a web-based data source. The web content accessed through the data panel 306 corresponds to the representative URL "www.datasource.come/page." In particular, the data panel 306 presents a rendered view of web content having a structured arrangement 604 of data elements. A data linker 206 as previously described may be invoked to auto-populate the layout structure 602 with data elements of the structured arrangement 604. In order to do so, a user may activate an auto-population tool. The user then makes a selection 606 of one or the design elements in the layout structure 602 and a selection 608 of one or more data elements in the structured arrangement 604 of web content to use for filling of the selected design element with content. The user input indicative of these selections is obtained and processed by the data linker 206 and/or digital media application 108. In response to the input, operations are initiated to link elements of the layout structure 602 with web data of the structured arrangement 604. For instance, the web content is analyzed to identify semantically similar repeating data elements within the structured arrangement. Based on this analysis, repeating data elements identified within the structured arrangement are matched to repeating design elements in the layout structure. The matching process may be repeated for different elements in the object set (e.g., image frame, text box, etc.). This creates links between the design elements of the layout structure and data elements of the web content, as represented by the link 610 formed between the selected design element and the selected data element. The linked design elements may then be auto-populated with content from repeating data elements to which the design elements are matched.

In implementations, a grid structure and hierarchy of elements in the web content is recognized as part of the analysis. The grid structure and hierarchy of the web content is then mapped to the layout structure 602. This mapping is used to determine the order in which data elements are used to auto-populate the layout structure 602. Generally, linked elements are mapped in a pre-defined order within respective structures, such as left-to-right and then top to-bottom. The order of mapping may be configurable for different scenarios by a developer or through user-accessible settings.

Having established the links and mapping between design elements and data elements, the data linker 206 auto-populates the layout structure 602 to form a populated design 612 as represented in view "B". Here, notice that the place-holder elements in the layout structure 602 of view "A" have been populated with content of data elements contained in the web content. In particular, image frames in view "B" are displayed with image content and text boxes for names are displayed with linked names.

It should be noted that the linking and auto-population may be adjusted along with expansions and contractions of a repeatable object set and replications. In other words, the links to the data elements are maintained and may be used to auto-populate additional replications so long as additional data elements are available in the data set. Consequently, if the layout structure is expanded as in the example of FIG. 5, the next available data elements and associated content contained in the web content are mapped to any replicated object sets created by the expansion in accordance with links that are formed and the order of mapping that is established.

An additional example of populating a visual design with web content is described in relation to the examples of FIGS.

Figure 7:
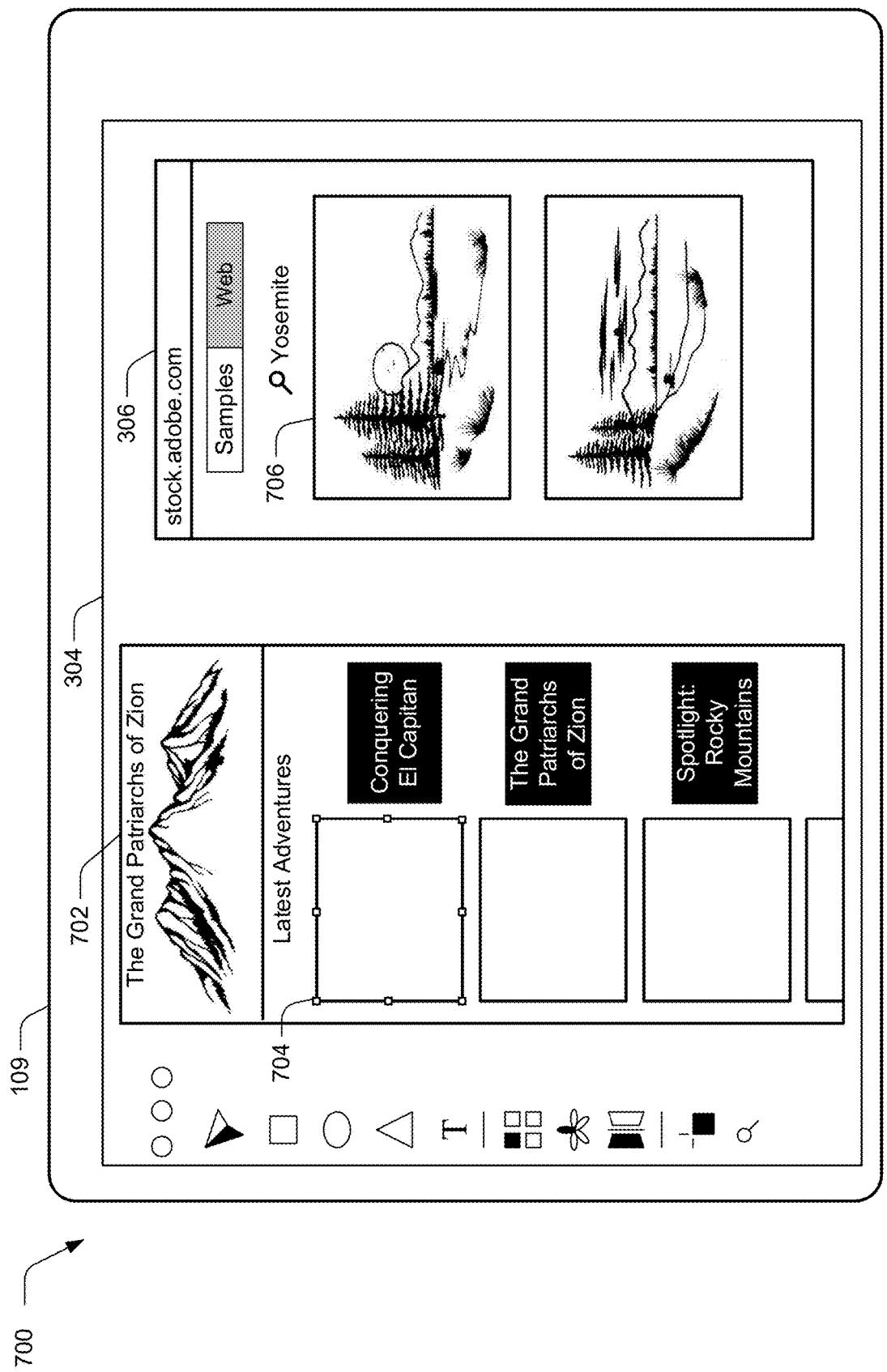
FIG. 7 depicts another example of a user interface for creation of visual designs in accordance with one or more implementations.

7 and 8. In particular, FIG. 7 depicts generally at 700 another example of a user interface for creation of visual designs in accordance with one or more implementations. The depicted user interface 109 includes an editing pane 304 used to create and edit a document design and a data panel 306 operable to auto-populate the design with web content in accordance with the previous description and techniques described herein. In this example, the editing pane 304 displays document design 702 with a layout structure that includes repeating objects sets 704. The repeating objects sets 704 each include an image frame as well as various other design elements. The image frame in the first of the repeating objects sets 704 is represented as being selected.

The data panel 306 displays a view of web content corresponding to a source accessed via the data panel 306. Here, the source corresponds to an image search service that provides access to a searchable repository of images. Accordingly, the web content presented in the data panel 306 is a collection of images 706 obtained in response to an image search conduct via the image search service. The images returned by the search may be used to populate the image frames of the repeating objects sets 704 in accordance with the techniques discussed herein. To do so, a user selects one of the images from the collection of images 706 to form a link to the selected image frame from the document design 702. This cause analysis of the structure of the web content and auto-population of all of the image frames of the layout structure with images from the collection in accordance with techniques described above and below.

Figure 8:
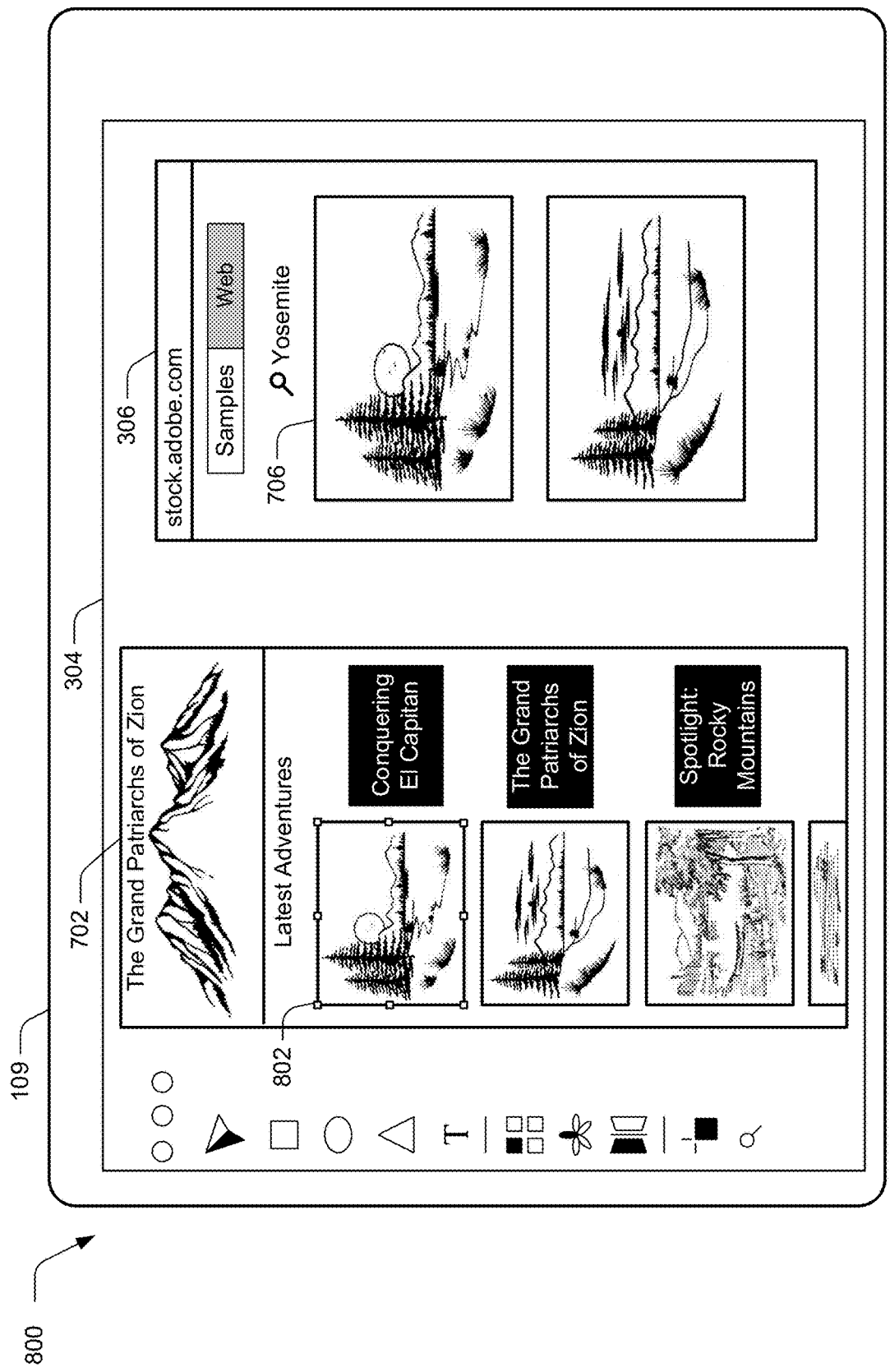
FIG. 8 depicts an example of user interface in which design a document is populated with web data in accordance with one or more implementations.

For example, FIG. 8 depicts generally at 800 an example of user interface in which design a document is populated with web data in accordance with one or more implementations. In particular, the example user interface 109 in FIG. 8 represents the document design 702 of FIG. 7 as being populated with images from the collection of images 706 to produce a populated design 802. Thus, a user is able to quickly produce a design and then populate elements of the design with web content as represented by the example of FIGS. 7 and 8, and other examples and techniques discussed herein.

Figure 9:
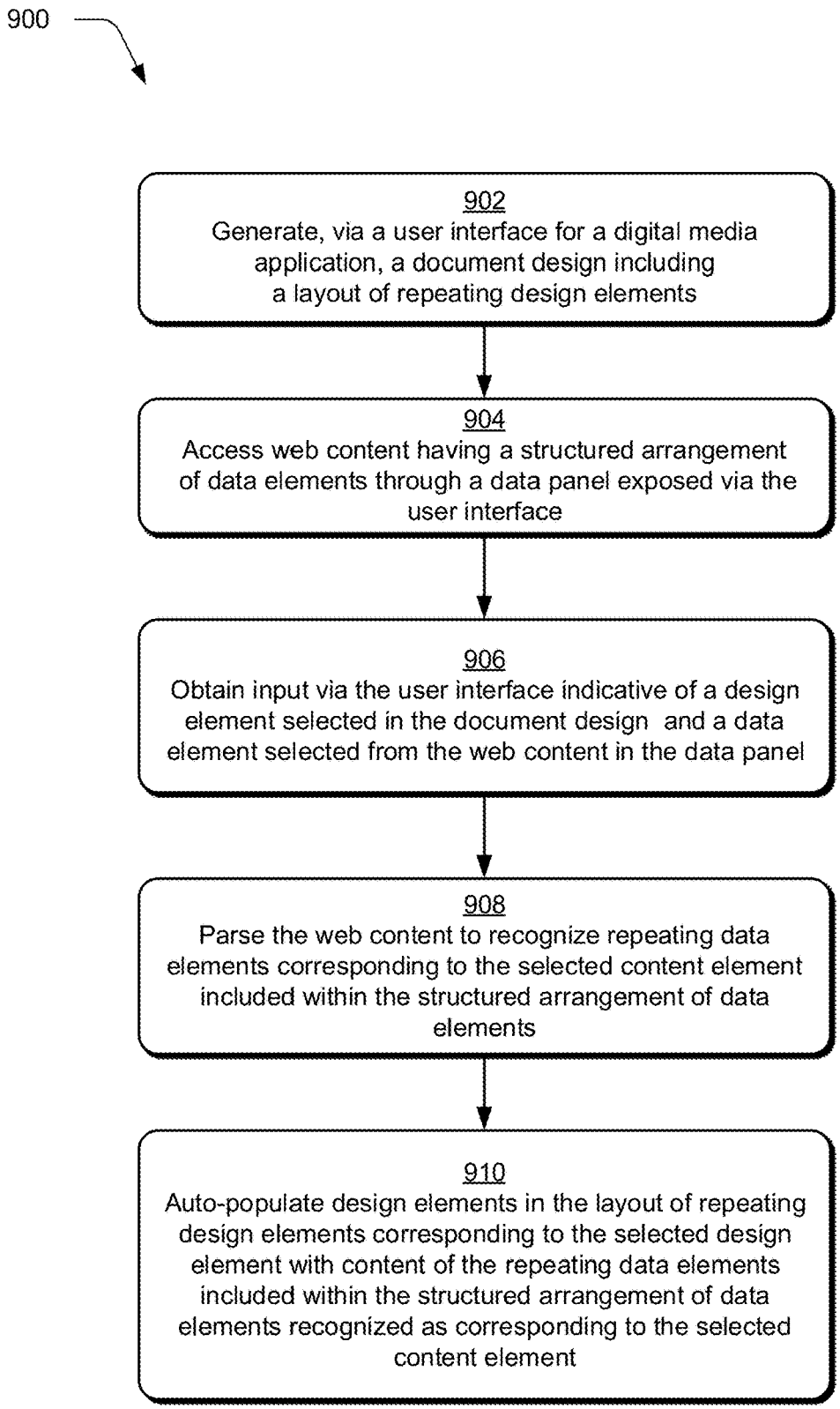
FIG. 9 depicts an example procedure in which repeating design elements of a document design are populated with web content in accordance with one or more implementations.
Figure 10:
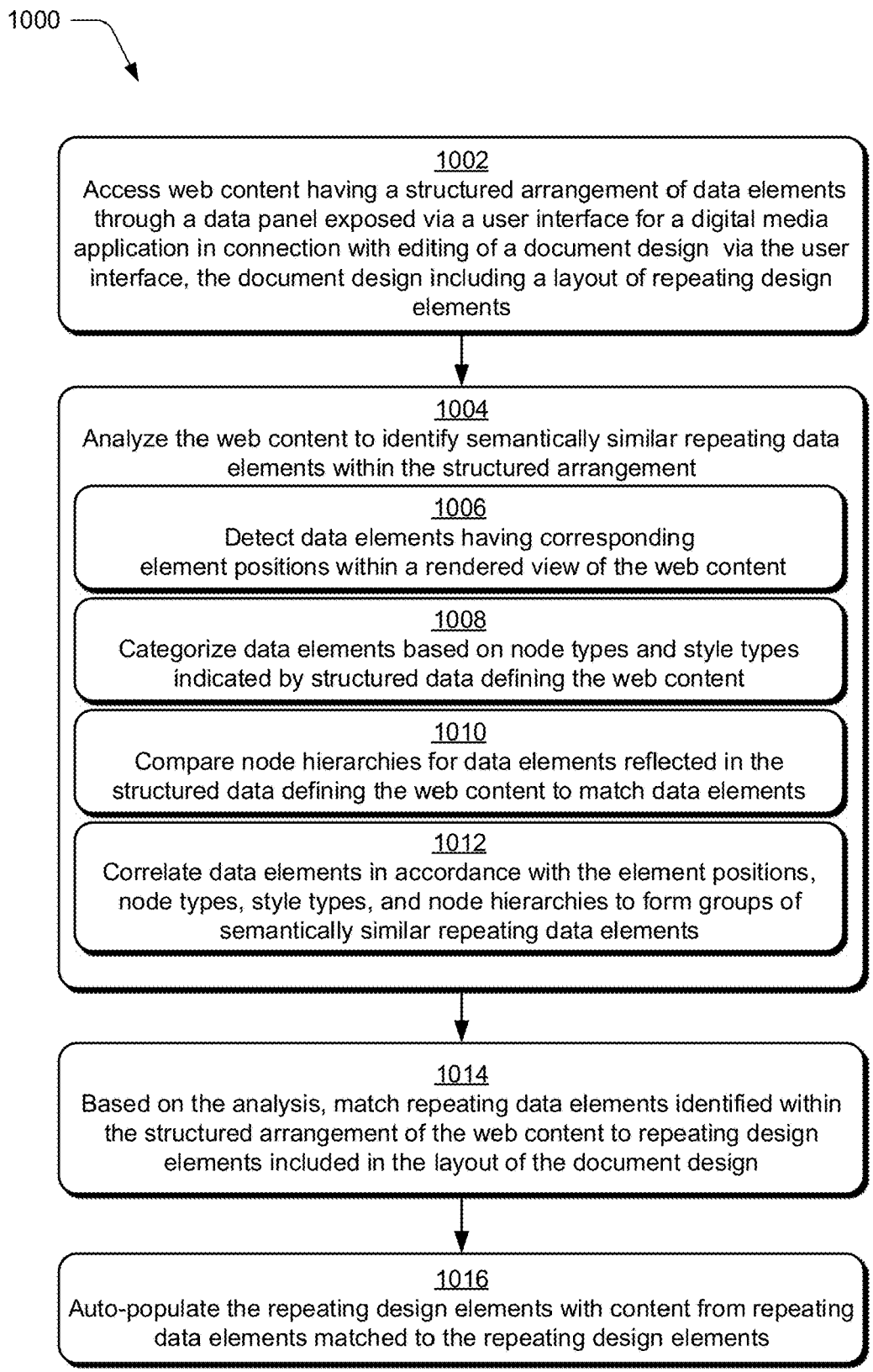
FIG. 10 depicts an example procedure in which web content is analyzed to detect semantically similar repeating data elements in accordance with one or more implementations.

Further aspects of techniques for populating visual designs with web content are discussed in relation to the discussion of example procedures of FIGS. 9 and 10 that follows. In particular, FIG. 9 depicts an example procedure 900 in which repeating design elements of a document design are populated with web content in accordance with one or more implementations. A document design including a layout of repeating design elements is generated via a user interface for a digital media application (block 902). For example, a document design may be created via a digital media application 108 in accordance with various examples discussed herein. An object replication tool 110 may be employed to produce a layout of repeating design elements within the document design. The layout has a structure like a grid or table with different portions (e.g., cells, rows, columns) etc. Design elements within the layout act as placeholders that may be populated with content. In accordance with techniques described herein, repeating design elements can be populated with web content.

To do so, web content having a structured arrangement of data elements is accessed through a data panel exposed via the user interface (block 904). Then, input is obtained via the user interface that is indicative of a design element selected in the document design and a data element selected from the web content in the data panel (block 906). For example, a data panel 306 as discussed previously may be invoked to access web content from various sources, including accessing web pages, JSON APIs, and other web-based resources. The data panel 306 may operate in conjunction with an object replication tool 110 and/or data linker 206 to access the web content and then link data elements of the web content to design elements in the manner previously discussed. The input that is obtained represents user selections made via a suitably configured user interface 109 for a digital media application 108 to initiate operations to link elements one to another and auto-populate a document design accordingly.

In particular, the web content is parsed to recognize repeating data elements corresponding to the selected content element included within the structured arrangement of data elements (block 908). Generally, parsing the web content involves correlating data elements within the web content in accordance with at least one of element positions, node types, style types, and node hierarchies as reflected by structured data defining the web content. This enable the data linker 206 or comparable functionality to detect semantically similar repeating data elements corresponding to the selected data element. Various approaches to detecting semantically similar repeating data elements are contemplated, examples and details of which can be found in the discussion the example procedure of FIG. 10 that follows. Once semantically similar repeating data elements are detected, the data elements may be mapped to design elements in the manner discussed in relation to the preceding examples. As noted previously, elements may be mapped according to a pre-defined order within respective structures of the web content and document design.

Then, design elements in the layout of repeating design elements corresponding to the selected design element are auto-populated with content of the repeating data elements included within the structured arrangement of data elements recognized as corresponding to the selected content element (block 910). Here, the links and mappings established based on analysis of the web content are utilized to determine how to populate the document design with content. Design elements are then filled with content and a view of the document design populated with content is exposed. Consequently, a developer is able to easily and efficiently produce visual designs and preview the design with live, "real-word" data from websites, web pages, APIs and other online sources.

FIG. 10 depicts an example procedure 1000 in which web content is analyzed to detect semantically similar repeating data elements in accordance with one or more implementations. In relation to the example procedure 1000, details are provided regarding various operations and algorithms suitable to detect semantically similar repeating data.

Web content having a structured arrangement of data elements is access through a data panel exposed via a user interface for a digital media application in connection with editing of a document design via the user interface, the document design including a layout of repeating design elements (block 1002). Web pages, APIs, and other web content may be accessed in various ways as discussed through this document. Then, the web content is analyzed to identify semantically similar repeating data elements within the structured arrangement block (1004). Generally, the web content is analyzed by applying a detection algorithm to examine the structure of the web content and recognize related elements based upon arrangement of the elements one to another, properties of the elements, and so forth. Various algorithms suitable to detect semantically similar elements are contemplated. In implementations, the analysis is based on selection of a target element by positioning of cursor within a rendered view of the web content or other suitable input to select an element. In this case, the analysis is triggered by the selection using the position and properties of the target element as "targets" to discover matching items. Different algorithms may be defined to find similar items included the web content through operations performed in various combinations and in different orders for the operations, some illustrative examples of which are represented and discussed as example operations for the analysis of block 1004 in the procedure 1000. The example operations are applied individually or in any combination of multiple operations to narrow a list/group of candidate elements based on various criteria down to a filtered set of matching items.

In one or more implementations, operations involved in the analysis to detect semantically similar elements include detecting data elements having corresponding element positions within a rendered view of the web content (block 1006). In particular, the visual structure of elements in the rendered view is examined to find elements having corresponding positions. In one approach, element positions are analyzed relative to a selection of a particular element to find elements that have corresponding positions with the arrangement of elements in the rendered view. Alternatively, a full semantic similarity analysis of the web content may be performed automatically when the content is accessed or loaded to determine groups of repeating data elements for the web content in its entirely. In either case, coordinates (e.g., x-y coordinates) or bounds for element positions are computed and compared one to another to identify the alignment of elements within the structured arrangement.

Generally, elements having coordinates or bounds intersecting common coordinate axes are grouped together as elements with corresponding positions. For a selected element, the process of finding elements with corresponding positions involves computing bounds of the selected data element in a coordinate system for the rendered view; and identifying data elements having bounds intersecting axes defined by the bounds of the selected data element as elements having element positions corresponding to the selected data element. Intersection axes may be defined based upon an explicit user selection of an element or relative to a target element selected automatically based on the structure and hierarchy of the web content. If the web content is subject to full semantic similarity analysis, the process may proceed iteratively through the structure and hierarchy to select different elements one at a time and then discover corresponding elements accordingly.

In an implementation, a tolerance factor is applied to the computed bounds or coordinates. The tolerance factor is designated to expand dimensions of the elements to account for misalignment of elements within the structured arrangement. In the absence of the tolerance factor, slight misalignment of elements would cause some elements to be incorrectly ignored. By way of example and not limitation, the tolerance factor may be defined in terms of a number of pixels for bounds of the elements, such as having tolerance factor in a range of about 1 to 10 pixels. A default tolerance factor may be set to a particular value (e.g., five pixels) and then the tolerance factor may be adjusted with a defined range.

In addition, the analysis may include categorizing data elements based on node types and style types indicated by structured data defining the web content (block 1008). Categorization of data elements may be applied separately or to refine groupings determined based on element positions and/or node hierarchies as discussed herein. In one or more implementations, the categorization filters elements by matching various properties of the elements. Elements having properties that match the target element are kept in the group. Elements that do not have properties matching the target element are removed. Node types may be determined by inspecting element tags within structured data for the web content (e.g., XML, HTML, or other structured data) to find common tags. Similarly, style types may be assessed by examining the style properties associated with elements example of which include font size, font type, colors, and so forth. Again, matching elements are kept in the group and mismatches are removed. Accordingly, structured data defining the web content may be analyzed to find nodes matching a node type and style associated with a selected data element. Then data elements for nodes found to match the node type and style are categorized as being semantically similar repeating data elements with respect to the selected data element.

Additionally, the analysis may include comparing node hierarchies for data elements reflected in the structured data defining the web content to match data elements (block 1010). The node hierarchy refers to the data structure of elements underlying the web content, such as the document object model (DOM) for a web page or JSON tree for a JSON API. Elements are defined within the data structure as nodes at different levels in a hierarchy. The node hierarchy may define nested elements for the web content such that a particular node may be nested with grandparent and parent nodes at outer levels (ancestor nodes) and child and grandparent nodes at inner levels (descendant nodes). Accordingly, elements may be compared one to another to assess similarity based in part upon whether node hierarchies for the elements match. Comparison of node hierarchies may be applied separately or to refine groups determined based upon element positions and/or categorizations described previously.

Accordingly, a node hierarchy of a selected node may be compared to node hierarchies for other data elements reflected in structured data defining the web content to find nodes matching the node hierarchy of the selected node. The other data elements are filtered based on the comparison to separate data elements associated with matching nodes from data elements associated with non-matching.

The matching of nodes may occur in accordance with a defined depth level. The depth level specifies the number of levels in the hierarchy are required to match between node to constitute a match for the purposes of similarity analysis. The depth level may be set at a fixed level or may be implemented as a configured parameter that enable tuning of the analysis. Elements corresponding having nodes that are considered matching at the defined depth level are kept in the group and elements having non-matching nodes are eliminated. In one approach, the depth level is specified at the grandparent level. Thus, if node hierarchies match up to the grandparent level, the nodes are considered as matching.

Then, data elements are correlated in accordance with the element positions, node types, style types, and node hierarchies to form groups of semantically similar repeating data elements (block 1012). The groups of semantically similar repeating data elements may be based on any one of the described operations applied individually or based on application of multiple operations together in any combination (e.g., analysis of block 1004 inclusive of operations per blocks 1006, 1008, 1010). For example, groups may be based on element positions alone or based on element positions groupings that are further refined based upon node hierarchy matching and/or categorization according to node type and styles.

Note that when web content is in the form of a JSON API, the similarity analysis may occur through direct examination of the JSON tree structure. In this approach, the data panel may be employed to render a tree structure representation of JSON data along with any images referenced by the data. A user provide input via a mouse or otherwise to navigate the JSON tree structure exposed in the data panel and select nodes for text values or images as target elements. Selection of one of the nodes initiates operation to find similar elements in the tree structure.

For instance, nodes in the JSON tree-structure have key values embedded in the JSON data. Similar elements defined by the JSON data will have the same key. Thus, the similarity analysis in this case involves parsing the tree-structure to find elements having the same key. In particular, given a selected node in the tree-structure, a key value for the selected node is extracted. A parent node of the selected node is then examined. If the parent node constitutes an array, corresponding child nodes in the tree structure are checked to see if node under the parent node have matching key values. If no matches are found at the parent level, the process is repeated at the grandparent level this time driving down two levels to check other grandchild nodes in the tree structure for matching key values. The process may continue to be expanded out to different levels of the hierarchy up the tree-structure until matching nodes are found or the end of the tree is reached without any matches. Elements having matching nodes are placed in the group of similar items.

Based on the similarity analysis, repeating data elements identified within the structured arrangement of the web content are matched to repeating design elements included in the layout of the document design (block 1014). Then, the repeating design elements are auto-populated with content from repeating data elements matched to the repeating design elements (block 1016). The matching involves creating links between the design elements of the layout structure and data elements of the web content as described previously. For instance, a grid structure and hierarchy of elements in the web content is recognized as part of the analysis. The grid structure and hierarchy of the web content is then mapped to the layout structure. This mapping is used to determine the order in which data elements are used to auto-populate the layout structure. As noted, linked elements may be mapped in a pre-defined order within respective structures, such as left-to-right and then top to-bottom. Design elements are then filled with content according to the links and mapping determined by the matching process. Optionally, links between the design elements of the layout structure and data elements of the web content are saved as part of the design file. The saved links may be employed to enable an auto-refresh option in which new data is fetched to refresh the linked content. Auto-refresh may occur responsive to selection of refresh control and/or automatically when the file is loaded or according to a timing parameter.

In connection with analysis to detect semantically similar repeating data elements as described herein, visual representations of the groups of repeating data elements may be displayed within a rendered view of the web content. For example, selection of a data element via a data panel may trigger operations to find semantically similar data elements within associated web content. Selection of the data element occur in various ways, such a position of a cursor relative to the element, clicking on the element, and so forth. In one example, hovering of a cursor in proximity a data element is effective to select the element and trigger analysis to detect semantically similar data elements.

Additionally, the user interface 109 and data panel 306 are configured to selectively display visual representation of the group of elements identified through the analysis in response to the hovering or other suitable input to select the element. Various visual representations are contemplated such as highlighting items of the groups, changing text properties like color or bolding, underline, exposing boxes around each element include in the group. The visual representations provide substantially instant visual feedback to a user regarding elements identified as being semantically similar to the selected item. The user may then be able to confirm the group of data elements and use the content of the group to populate a document design or reject the group and provide further input to access and use a different web content for auto-population. Examples of techniques to expose visual representations of elements grouped as being semantically similar are depicted and described in relation to FIGS. 11 and 12.

Figure 11:
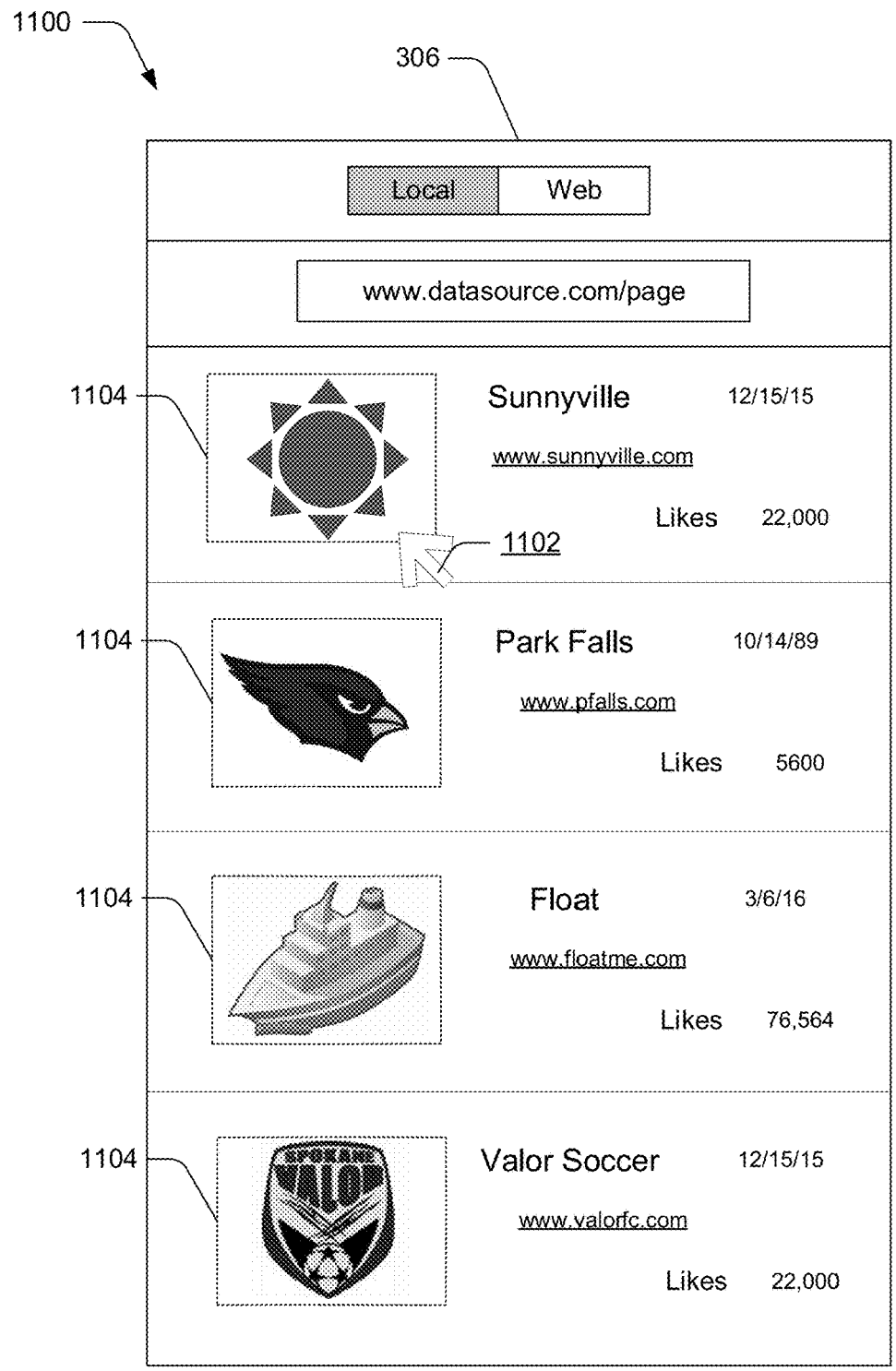
FIG. 11 depicts an example illustration of a data panel in accordance with one or more implementations.

For instance, FIG. 11 depicts generally at 1100 an example illustration of a data panel in accordance with one or more implementations. In this example, the data panel 306 depicts web content having repeated elements within respective object sets in accordance with techniques described in this document. FIG. 11 further represent a selection 1102 of an image in the first object set rendered at the top of the data panel. The selection may occur by hovering of the cursor over the image (as illustrated), clicking on images, or otherwise. The selection triggers analysis to find corresponding elements that repeat within the structure of the web content in the previously described manner Additionally, a visual representation of the group of elements identified as being semantically similar is exposed via the data panel 306. In the depicted example, the visual representation is in the form of bounding boxes 1104 that are rendered around each element in the repeating group. Naturally, other types of visual representations are also contemplated.

Figure 12:
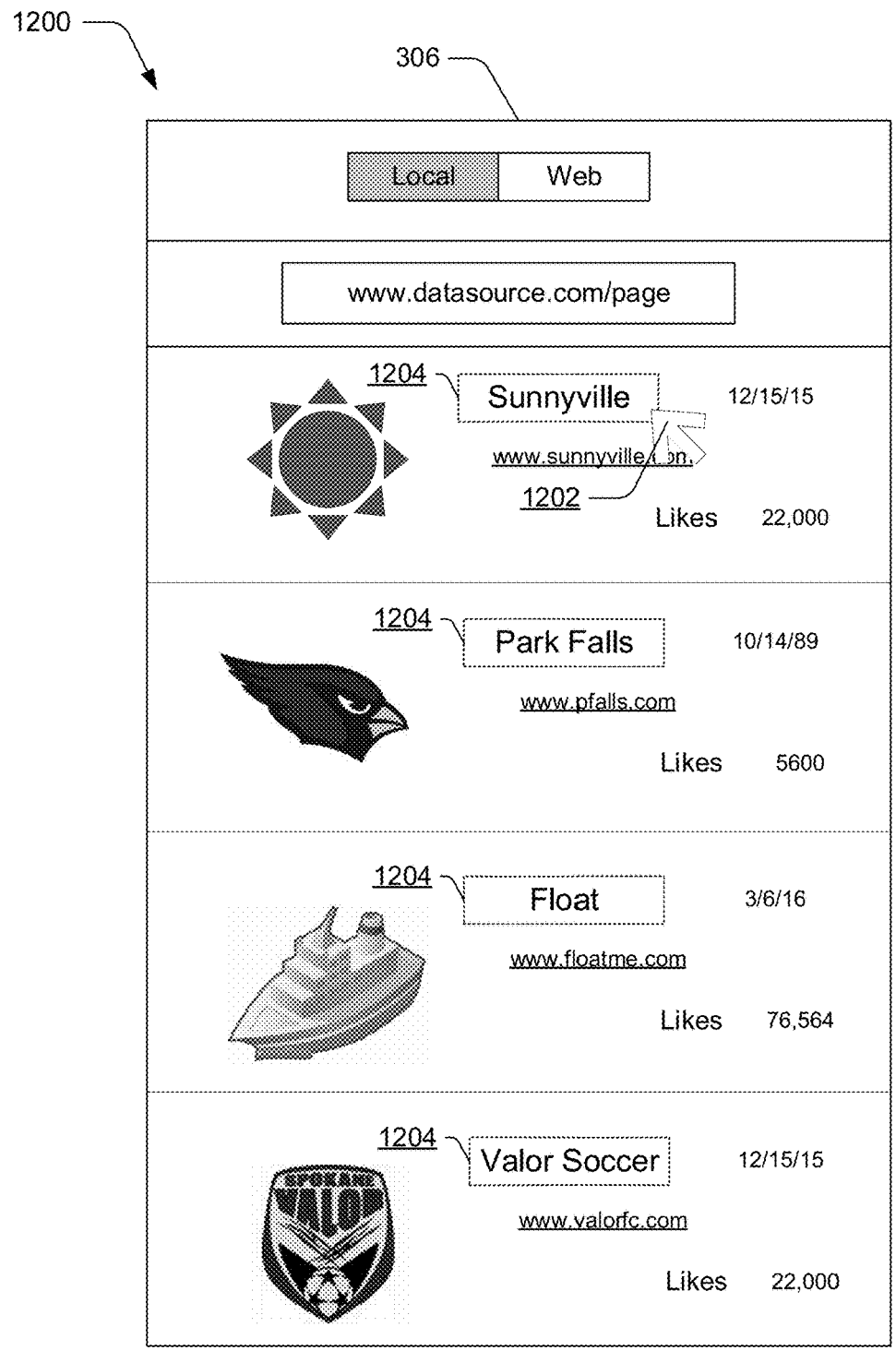
FIG. 12 depicts another example illustration of a data panel in accordance with one or more implementations.

The visual representation changes accordingly as different elements are selected. This is represented by FIG. 12, which depicts generally at 1200 another example illustration of a data panel in accordance with one or more implementations. Here, a selection 1202 of a text field for a title in the first object set is illustrated. Consequently, bounding boxes 1104 of FIG. 11 no longer appear and bounding boxes 1204 are exposed around each element in a repeating group of text fields derived based on the selection 1202. In this manner, visual representations of repeating data element groups are selectively shown as a user navigates web content displayed via a data panel and selects different items.

Having considered the forgoing example details, procedures, user interfaces and examples, consider now a discussion of an example system including various components and devices that can be employed for one or more implementations of image search techniques described herein.

Example System and Device

Figure 13:
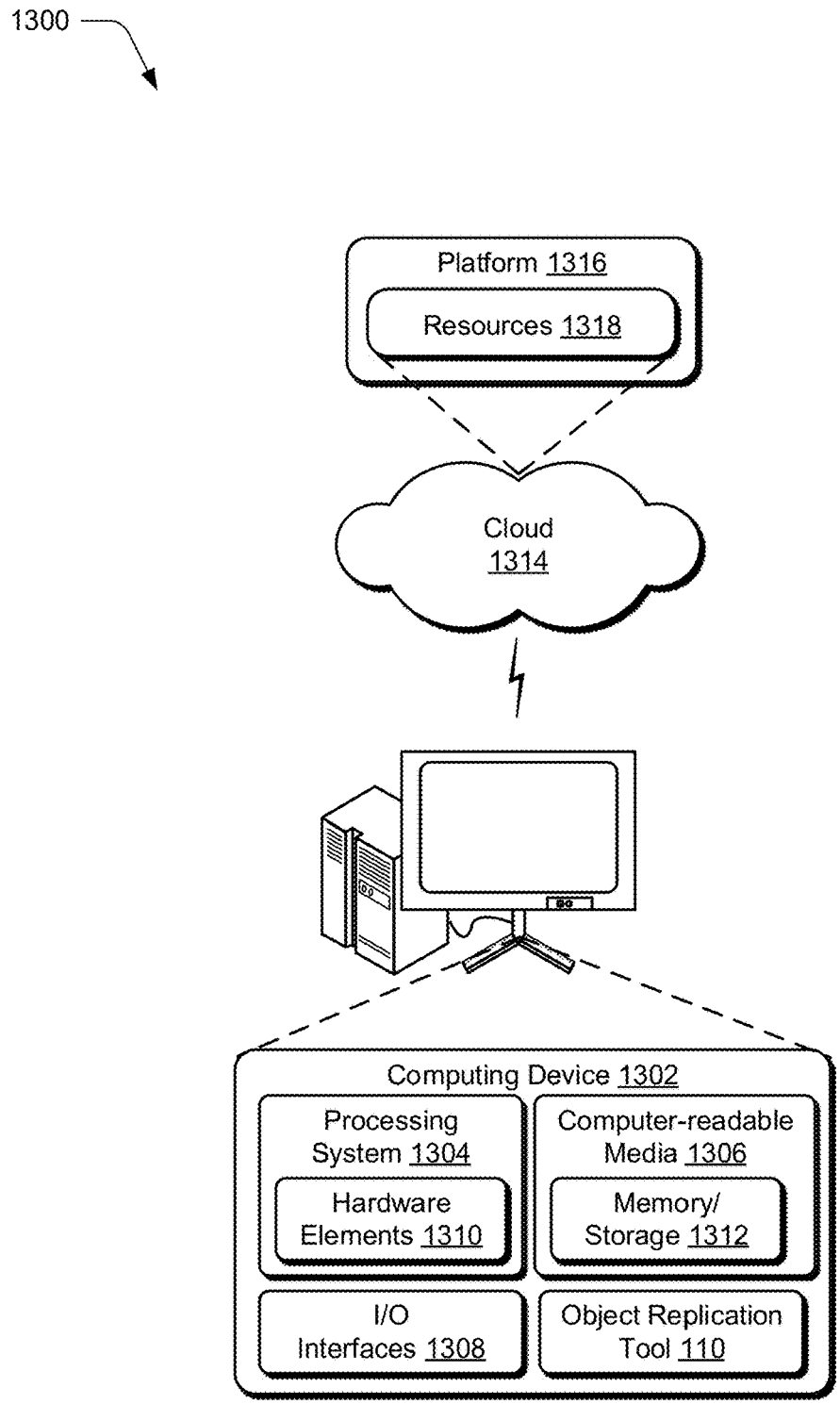
FIG. 13 illustrates an example system including various components of an example device that can be employed for one or more implementations of the techniques described herein.

FIG. 13 illustrates an example system generally at 1300 that includes an example computing device 1302 that is representative of one or more computing systems and/or devices that may implement the various techniques described herein. This is illustrated through inclusion of the object replication tool 110, which operates as described above. The computing device 1302 may be, for example, a server of a service provider, a device associated with a client (e.g., a client device), an on-chip system, and/or any other suitable computing device or computing system.

The example computing device 1302 is illustrated as including a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In a digital media environment to facilitate creation of content using one or more computing devices, a method implemented by the one or more computing devices, the method comprising:
   generating, via a user interface for a digital media application on the one or more computing devices, a document design including a structured layout of object sets, each object set including multiple objects for containing data of different data types;
   receiving, via the user interface, a data file including multiple elements, each of the multiple elements being one of the different data types;
   receiving, via the user interface, an indication of a target element of the multiple elements in the data file;
   determining matching elements of the multiple elements in the data file according to the different data types and based on positions of the matching elements in the data file relative to a position of the target element in the data file;
   determining style types of the matching elements;
   removing at least some of the matching elements based on the style types to form updated matching elements; and
   auto-populating in the user interface at least one of the multiple objects of each of the object sets in the structured layout with content of a respective one of the updated matching elements.

2. The method as described in claim 1, wherein the generating comprises:
   positioning the multiple objects for one of the object sets within the structured layout;
   grouping the multiple objects for the one of the object sets to form a repeatable object set; and
   replicating the repeatable object set to form the object sets.

3. The method as described in claim 1, wherein the data of different data types includes image data and text data, one of the multiple objects includes an image frame for containing some of the image data, another of the multiple objects includes a text box for containing some of the text data, and the multiple elements include one or more images or one or more text values.

4. The method as described in claim 1, wherein the receiving the data file includes the data file being dragged and dropped in the user interface.

5. The method as described in claim 1, wherein the receiving the data file includes obtaining the data file from a source local to the one or more computing devices.

6. The method as described in claim 1, wherein the auto-populating is in a user-configurable order based on a mapping of the matching elements of the multiple elements in the data file to the structured layout of object sets.

7. The method as described in claim 1, wherein the structured layout of object sets includes a repeating array of cells, each cell including one of the object sets.

8. The method as described in claim 1, further comprising receiving a user confirmation of the updated matching elements of the multiple elements, wherein the auto-populating is responsive to the receiving the user confirmation.

9. The method as described in claim 1, further comprising expanding previous positions of the matching elements in the data file by a tolerance factor to determine the positions of the matching elements in the data file.

10. In a digital media environment to facilitate creation of content using one or more computing devices, a system comprising:
    one or more processing devices; and
    one or more computer-readable media storing instructions executable via the one or more processing devices to implement a digital media application to:
       generate, via a user interface of the digital media application, a document design including a structured layout of object sets, each object set including multiple objects for containing data of different data types;
       receive, via the user interface, a data file including multiple elements, each of the multiple elements being one of the different data types;
       receive, via the user interface, an indication of a target element of the multiple elements in the data file;

determine matching elements of the multiple elements in the data file according to the different data types and based on positions of the matching elements in the data file relative to a position of the target element in the data file;

determine style types of the matching elements;

remove at least some of the matching elements based on the style types to form updated matching elements; and auto-populate in the user interface at least one of the multiple objects of each of the object sets in the structured layout with content of a respective one of the updated matching elements of the multiple elements.

11. The system as described in claim 10, wherein the digital media application is implemented to generate the document design including to:

position the multiple objects for one of the object sets within the structured layout;

group the multiple objects for the one of the object sets to form a repeatable object set; and replicate the repeatable object set to form the object sets.

12. The system as described in claim 11, wherein the digital media application is implemented to replicate the repeatable object set responsive to expanding a boundary of the one of the object sets.

13. The system as described in claim 10, wherein the data of different data types includes image data and text data, one of the multiple objects includes an image frame for containing some of the image data, and another of the multiple objects includes a text box for containing some of the text data.

14. The system as described in claim 10, wherein the digital media application is implemented to receive the data file including the data file being dragged and dropped in the user interface.

15. The system as described in claim 10, wherein the digital media application is implemented to search a node hierarchy that describes the data file to determine key values of nodes in the node hierarchy for the multiple elements in the data file, and determine the matching elements of the multiple elements in the data file as having a same key value.

16. The system as described in claim 15, wherein the digital media application is configured to implement the search based on an order of first child nodes of parent levels followed by second child nodes of third child nodes of grandparent levels, the order constraining the search to a level in the node hierarchy corresponding to the key values.

17. In a digital media environment to facilitate creation of content using one or more computing devices, a method implemented by the one or more computing devices, the method comprising:

generating, via a user interface for a digital media application on the one or more computing devices, a document design including a structured layout of object sets, each object set including an image frame for containing image data and a text box for containing text data;

receiving, via the user interface, a data file including multiple elements, each of the multiple elements being one of an image data type or a text data type;

receiving, via the user interface, an indication of a target element of the multiple elements in the data file;

determining matching elements of the multiple elements in the data file to the target element according to the image data type and the text data type and based on positions of the matching elements in the data file relative to a position of the target element in the data file;

determining style types of the matching elements;

removing at least some of the matching elements based on the style types to form updated matching elements; and auto-populating in the user interface at least one of the image frame or the text box of each of the object sets in the structured layout with content of a respective one of the updated matching elements.

18. The method as described in claim 17, wherein the generating comprises:

positioning the image frame and the text box for one of the object sets within the structured layout;

grouping the image frame and the text box for the one of the object sets to form a repeatable object set; and replicating the repeatable object set to form the object sets.

19. The method as described in claim 17, further comprising:

generating links between the matching elements and the image frame or the text box of said each object set;

saving the links in a design file for the document design;

loading the design file into the digital media application; and auto-refreshing, based on the links and automatically responsive to the loading the design file, the at least one of the image frame or the text box of each of the object sets in the structured layout with additional content of the respective one of the updated matching elements.

20. The method as described in claim 17, further comprising expanding previous positions of the matching elements in the data file by a tolerance factor to determine the positions of the matching elements in the data file.

* * * * *